I. P. CARPENTER.
AUTOMOBILE LOCK.
APPLICATION FILED MAR. 3, 1920.
1,358,416.
Patented Nov. 9, 1920.
2 SHEETS—SHEET 2.
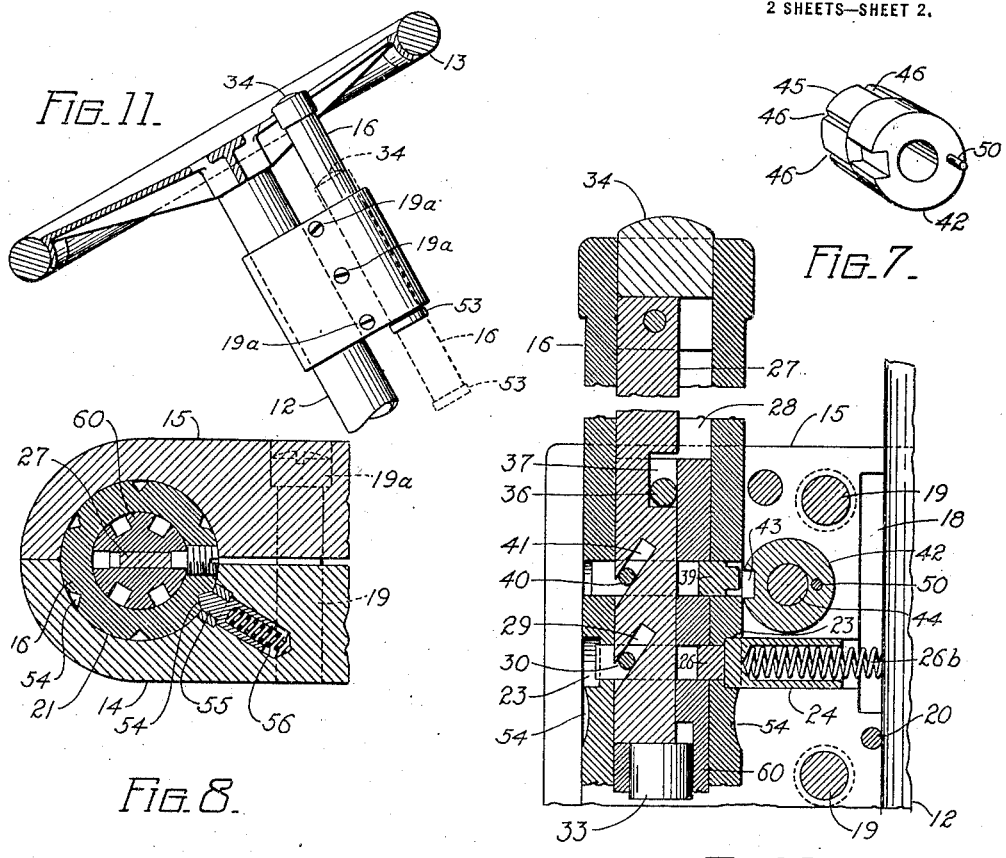
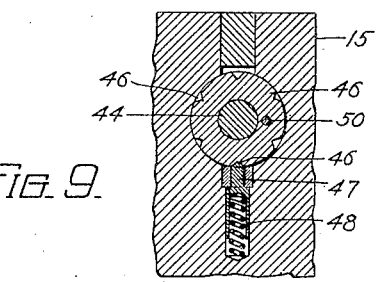
Inventor
ISAAC PARKER CARPENTER.
Attys.

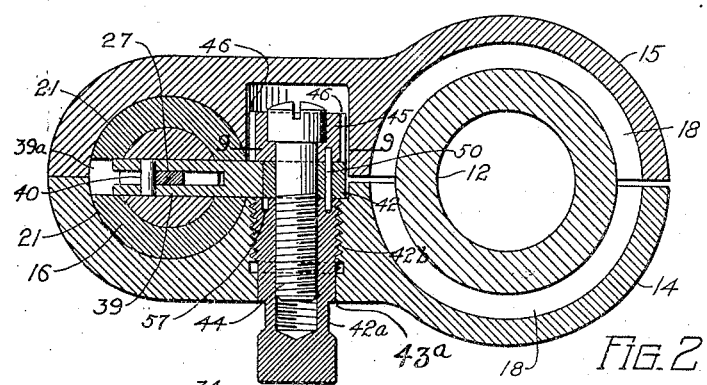

UNITED STATES PATENT OFFICE.

ISAAC P. CARPENTER, OF WALTHAM, MASSACHUSETTS.

AUTOMOBILE-LOCK.

1,358,416.                Specification of Letters Patent.    Patented Nov. 9, 1920.

Application filed March 3, 1920. Serial No. 363,001.

*To all whom it may concern:*

Be it known that I, ISAAC PARKER CARPENTER, a citizen of the United States, residing at Waltham, in the county of Middlesex and State of Massachusetts, have invented new and useful Improvements in Automobile-Locks, of which the following is a specification.

This invention relates to means for preventing unauthorized operation of an automobile, by locking the steering-wheel thereof in such manner that the wheel cannot be turned to steer the vehicle.

The invention is embodied in a steering-wheel lock comprising a holder adapted to be fixedly secured to a steering-column, a wheel-locking bolt movable endwise in said holder, and adapted to be projected between two adjacent spokes of the steering-wheel, the bolt and holder being provided with complemental means for locking the bolt in its projected operative position, and a manually operable permutation mechanism for unlocking the bolt and permitting it to drop from between the wheel spokes, said permutation mechanism being organized to require a sequence of manual operations, these operations being impossible of performance by a person who does not know the combination.

Of the accompanying drawings forming a part of this specification,—

Figure 1 is a side view of a portion of a steering column and a longitudinal section of a lock embodying the invention, applied to the steering-column.

Fig. 2 is a section on line 2—2 of Fig. 1.

Fig. 3 is a section on line 3—3 of Fig. 1.

Fig. 4 is a perspective view of the slide hereinafter referred to.

Figs. 5 and 6 are perspective views of the tumblers hereinafter referred to.

Fig. 7 is a perspective view of the recessed sleeve and the notched registering disk, hereinafter referred to.

Fig. 8 is a section on line 8—8 of Fig. 1.

Fig. 9 is a section on line 9—9 of Fig. 2.

Fig. 10 is a fragmentary sectional view, similar to portions of Fig. 1, showing the bolt locked in its projected operative position.

Fig. 10ª is a fragmentary view similar to portions of Fig. 10, showing the recessed sleeve in a different position.

Fig. 11 is a side view of a portion of the steering-column, the steering-wheel being shown in section, and a side view of the lock embodying the invention, secured to the column, the bolt being operatively projected to lock the steering-wheel.

The same reference characters indicate the same parts in all of the figures.

In the drawings, 12 represents the steering-column of an automobile, and 13 the steering-wheel attached to a steering-post rotatably mounted in the column. 14 and 15 represent the parts or sections of a holder adapted to be clamped upon the column at a suitable distance below the wheel, and to guide a cylindrical bolt 16, which is adapted to be projected between the steering-wheel spokes, as shown by Fig. 1, and limit the turning movement of the wheel, the holder being provided with means for locking the bolt in its projected position.

The sections 14 and 15 are provided with semi-circular clamping jaws, formed to grip the periphery of the column, as shown by Figs. 1 and 2, and are connected by clamping screws 19, each having a screw-thread engagement with one section, and a head seated on the other section, the arrangement being such that when the screws are tightened, the jaws 18 firmly grip the column. After the screws are driven home, their heads 19ª may be protected by plugs driven into countersunk holes in one of the sections, to prevent the removal of the screws. To prevent the possibility of the turning of the holder on the column, I prefer to drive a hardened steel pin 20 into holes formed in the sections, one side of the pin slightly indenting the column, as shown by Fig. 1. The holder sections are provided with longitudinal recesses 21, which are semi-circular in cross section, and form a guide in which the bolt 16 is movable endwise and adapted to rotate, the portions of the sections containing said guide being formed to abut together, and the portions having the jaws 18 are spaced apart, as shown by Fig. 2, so that the operation of clamping the jaws upon the column does not cause the bolt-guiding portions of the sections to bind on the bolt.

23 represents a peripheral groove formed in the bolt, to receive a detent 24, whereby the bolt is locked when projected. Said detent is preferably square in cross section, as shown by Fig. 3, and slides in guiding grooves 25 formed in the adjacent inner surfaces of the sections 14 and 15. The detent is normally forced into the groove 23 by a spring 26$^b$, which may be seated at one end on the steering column, as shown by Fig. 1. When the detent is in the groove 23, the bolt, although locked against endwise movement, is free to rotate.

The only operation required to lock the bolt as described, is to raise it from the inoperative or retracted position shown by dotted lines, to the position shown by full lines in Fig. 11, the groove 23 receiving the detent 24, as shown by Fig. 10, when the bolt reaches the last-named position.

For unlocking the bolt and permitting its retraction, I employ a permutation unlocking mechanism including tumblers, which must be set in harmony with other parts, to permit the retraction of the bolt, said mechanism being adapted to be so set for action that it can be caused to perform its function only by a predetermined sequence of manual operations. An element of the preferred permutation mechanism here shown, is a detent-displacing tumbler 26, shown separately by Fig. 6. This tumbler is movable in a transverse slot or guideway 26$^a$ in the bolt 16, and is adapted to be projected into the groove 23, to force the detent 24 out of the groove, as shown by Fig. 1, and to be retracted from the groove, as shown by Fig. 10, to permit the detent to enter the groove. The tumbler 26 is projected and retracted by means including a slide 27 movable in a longitudinal guideway 28 in the bolt 16, and provided with an inclined slot 29, a pin 30 fixed to the tumbler and extending through said slot, and a spring 31 seated on an abutment 32 in the lower end of the bolt, and acting through a plunger 33 on the slide 27. The outer end of the slide is provided with a head or push piece 34 adapted to be pressed by a finger of the operator from the position shown by Fig. 10, in which the slide is held normally by the spring 31, to that shown by Fig. 1, the movements of the slide being limited by a stop pin 36 fixed to the bolt and the ends of a recess 37 in the slide.

Other elements of the permutation mechanism are, first, a slide-locking tumbler 39, shown separately by Fig. 5, movable in another transverse slot or guideway 39$^a$ in the bolt 16, and having a pin 40 extending through an inclined slot 41 in the slide, and secondly, a sleeve 42, adapted to coöperate with the tumbler 39 in locking the slide 27. Said sleeve is manually rotatable in the holder by a stud 42$^a$ (Fig. 2) and has a cylindrical periphery interrupted by a recess 43, formed to receive one end of the tumbler 39, as shown by Fig. 1. When the sleeve 42 is in the position shown by Figs. 1 and 10, the slide 27 is movable by manual pressure to simultaneously move the tumblers 26 and 39 to the positions shown by Fig. 1, and by the spring 31 to move the tumblers to the positions shown by Fig. 10. The periphery of the sleeve 42 constitutes a stop adapted to lock the tumbler 39, as indicated by Fig. 10$^a$, at the inward extreme of its movement, and thus cause the pin 40 of the tumbler to coöperate with the inclined slot 41 in locking the slide 27 in its outward position (Fig. 10), the slide at the same time locking the tumbler 26 through the coöperation of the inclined slot 29 and tumbler pin 30. The stud 42$^a$ is adapted to be turned manually in a socket 43$^a$ in the holder section 14, the sleeve being secured to the inner end of the stud, preferably by a screw 44 engaging a tapped socket in the stud. The screw 44 serves also to secure to the sleeve 42 a registering disk 45, having grooves 46 in its periphery, said grooves coöperating with a yielding pointed detent 47 pressed by a spring 48 (Fig. 9).

The stud 42$^a$ has an external screw-thread 42$^b$, (Fig. 2), engaged with an internally threaded socket in the section 14, so that rotation of the stud causes an endwise movement thereof. The stud may, therefore, be moved by its rotation outward to locate the recess 43 out of alinement with the tumbler 39, and inward to bring the recess into alinement with the tumbler, these movements being possible when the tumbler is in the position shown by Fig. 10, and out of engagement with the recess 43.

Provision is made for varying the angular position of the disk 45 and sleeve 42 on the screw 44, to vary the initial position of the recess 43, so that the sleeve may be set with the recess out of the path of the tumbler 39 to any desired extent, a predetermined rotation of the sleeve being required to bring the recess into the path of the tumbler. To this end the disk 45 is provided with a pin 50 extending through a hole formed for its reception in the sleeve 42, and adapted to enter either of a plurality of sockets 57 (Fig. 2) in the inner end of the stud 42$^a$.

As above stated, the bolt 16 is rotatable in the holder, and this is true whether the bolt be locked in its projected position or not. The inner end of the bolt is provided with a knob or head 53 adapted to be turned by the operator. A portion of the periphery of the bolt is provided with grooves 54 (Fig. 8), this portion constituting in effect a registering disk, coaxial with the bolt, and adapted to coöperate with a yielding pointed detent 55, pressed by a spring 56. The inner end portion of the bolt 16 is provided with a bushing 60 attached to the bolt by a screw stud 61 (Fig. 1). The lower portion of said bushing is formed internally to guide and laterally support the spring 31 and plunger 33, and its upper portion is formed to guide the slide 27. The spring abutment 32 is inserted in the lower end of the bushing 60, and is secured thereto by a pointed screw stud 64 entering a peripheral groove 65 in the abutment.

Operation:

The bolt 16 is locked in its projected position by the springing of the detent 24 into the groove 23, as already described, the slide 27 being in its normal position (Fig. 10), so that the tumbler 26 is out of the groove. It is assumed that before locking the bolt, the operator has turned the sleeve 42 to a position such as that indicated by Fig. 10ª, and has also turned the bolt to move the tumblers 26 and 39 so that their paths will not coincide respectively with the detent 24 and the recess 43 when the latter is in the tumbler-receiving position shown by Fig. 10. To now unlock the bolt, the operator rotates the sleeve 42 to bring its recess 43 to the tumbler-receiving position, this position being ascertained by counting the number of yielding engagements of the spring detent 47 with the grooves 46 of the registering wheel. Variations of this count may be obtained by changing the position of the sleeve 42 while the holder sections are separated. The operator also rotates the bolt until a mark 51 (Fig. 1) on the head 53 comes to the location selected as the starting point. From this point the bolt is rotated until the operator ascertains, by the number of yielding engagements of the spring detent 55 with the bolt grooves 54, that the path of the tumbler 39 is in alinement with the sleeve recess 43. Pressure on the push piece 34 will now cause the slide 27 to force the tumbler 26 into the groove 23, and thus push the detent 24 out of said groove, the sleeve recess 43 at the same time receiving the tumbler 39. The width of the recess 43 is so much greater than the thickness of the entering portion of the tumbler 39, that the bolt 16 drops slightly when the detent 24 is displaced, thus causing the detent to bear on the periphery of the bolt above the groove 23, as shown by Fig. 1, so that the detent cannot reënter the groove. Finally the operator releases the slide 27, whereupon the spring 31 acts on the slide to withdraw the tumblers from the groove 23 and from the recess 43. The bolt now drops from its projected position and releases the steering-wheel. If desired more than one tumbler 39 and recessed sleeve 42 may be provided, to increase the intricacy of the problem of unlocking the bolt.

It will be seen that the manually rotatable bolt 16, is an element of the permutation unlocking mechanism, and that the manual rotation of the bolt after it has been moved to its operative position, sets the unlocking mechanism so that the bolt can be unlocked only by a predetermined series of manual operations. The sleeve or rotary member 42, and the tumbler 39 coöperating therewith, may be rendered inoperative as elements of the unlocking mechanism by turning the sleeve from the position shown by Fig. 10ª to that shown by Fig. 10, so that the bolt may be unlocked by two successive manual operations, including, first, a partial rotation of the bolt, and then an endwise movement of the slide 27. The rotary member 42, when used as an element of the permutation mechanism, increases the difficulty of the unlocking problem.

As implied in the foregoing description and in the following claims, I am not limited to the specific mechanism of the preferred embodiment of my improvements shown by the drawings, except as otherwise required in certain of the more limited claims.

I claim:

1. A steering-wheel lock comprising a holder adapted to be secured to a steering column, a wheel-locking bolt movable endwise in said holder, the bolt and holder being provided with complemental means for automatically locking the bolt in its operative position, the bolt being manually rotatable in the casing and constituting an element of a permutation unlocking mechanism, adapted to be set by the rotation of the bolt after the latter is locked, and means completing the permutation unlocking mechanism, said mechanism being operative to unlock the bolt by successive manual operations, including a partial rotation of the bolt.

2. A steering-wheel lock comprising a holder adapted to be secured to a steering column, a wheel-locking bolt movable endwise in said holder, the bolt and holder being provided with complemental means for automatically locking the bolt in its operative position, the bolt being manually rotatable in the casing and constituting an element of a permutation unlocking mechanism, adapted to be set by the rotation of the bolt after the latter is locked, and means completing the permutation unlocking mechanism, and including a slide manually movable in the bolt, said mechanism being operative to unlock the bolt by successive manual operations, including a partial rotation of the bolt and an endwise movement of the slide.

3. A steering-wheel lock comprising a holder adapted to be secured to a steering column, a wheel-locking bolt movable endwise in said holder, the bolt and holder being provided with complemental means for automatically locking the bolt in its operative position, the bolt being manually rotatable in the casing and constituting an element of a permutation unlocking mechanism, adapted to be set by the rotation of the bolt after the latter is locked, and means completing the permutation unlocking mechanism, and including a slide manually movable in the bolt, and a member manually rotatable in the casing, said mechanism being operative to unlock the bolt by successive manual operations, including a partial rotation of the bolt, an endwise movement of the slide, and a partial rotation of said rotatable member.

4. A steering-wheel lock comprising a holder adapted to be secured to a steering-column, a wheel-locking bolt movable endwise in said holder and provided with a peripheral locking groove, a spring-pressed detent guided by the holder, and adapted to automatically enter said groove and lock the bolt in its operative position, a detent-displacing tumbler movable in the bolt and constituting an element of a permutation unlocking mechanism, a slide manually movable in one direction in the bolt, a spring adapted to move the slide in the opposite direction, said slide and tumbler being interengaged to cause the actuation of the tumbler by the slide, and the bolt being rotatable in the holder to move the tumbler into and out of operative relation with the detent, and registering means including a notched registering disk coaxial and rotatable with the bolt, and a yielding detent coöperating with the notches in said disk.

5. A steering-wheel lock comprising a holder adapted to be secured to a steering column, a wheel-locking bolt movable endwise in said holder and provided with a peripheral locking groove, a spring-pressed detent guided by the holder, and adapted to automatically enter said groove and lock the bolt in its operative position, a detent-displacing tumbler movable in the bolt and constituting an element of a permutation unlocking mechanism, a slide manually movable in one direction in the bolt, a spring adapted to move the slide in the opposite direction, said slide and tumbler being interengaged to cause the actuation of the tumbler by the slide, and the bolt being rotatable in the holder to move the tumbler into and out of operative relation with the detent, registering means including a notched registering disk coaxial and rotatable with the bolt, and a yielding detent coöperating with the notches in said disk, and additional permutation mechanism elements, including a slide-locking tumbler movable in the bolt and interengaged with the slide to cause the actuation of the locking tumbler by the slide, a manually rotatable sleeve journaled in the holder and having a recess adapted to receive the locking tumbler, and a peripheral portion constituting a tumbler stop, adapted to prevent movements of the slide and locking tumbler, and registering means including a notched disk fixed to and coaxial with said sleeve, and a yielding detent coöperating with the notches in said disk.

6. A steering-wheel lock substantially as specified by claim 4, said slide and detent-displacing tumbler being provided respectively with an inclined slot, and with a pin engaging said slot, whereby the tumbler is actuated by movements of the slide.

7. A steering-wheel lock substantially as specified by claim 5, said slide being provided with two inclined slots and each of said detents being provided with a pin engaging one of said slots, whereby the tumblers are actuated simultaneously by movements of the slide.

8. A steering-wheel lock substantially as specified by claim 5, means being provided for rotatively adjusting the said recessed sleeve the angular position of its recess.

In testimony whereof I have affixed my signature.

ISAAC P. CARPENTER.